Oct. 2, 1928.                         1,686,114
C. H. WALTER
FISH BAIT OR LURE
Filed Aug. 22, 1927

INVENTOR
Clarence H. Walter
BY Chappell & Earl
ATTORNEYS

UNITED STATES PATENT OFFICE.

CLARENCE H. WALTER, OF NILES, MICHIGAN.

FISH BAIT OR LURE.

Application filed August 22, 1927. Serial No. 214,759.

The main object of this invention is to provide an improved fish bait or lure which is weedless and at the same time is attractive to fish and efficient in that it effectively engages the fish when struck.

Objects pertaining to details and economies of my invention will definitely appear from the detailed description to follow. The invention is defined in the claims.

A structure embodying the features of my invention is illustrated in the accompanying drawing, in which.

Figure 1:
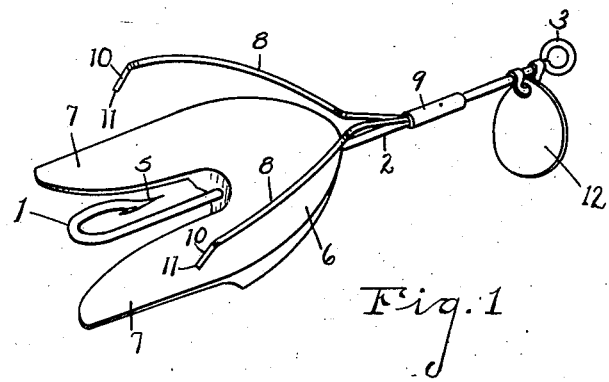
Fig. 1 is a top perspective view of my improved fish bait or lure.
Figure 2:
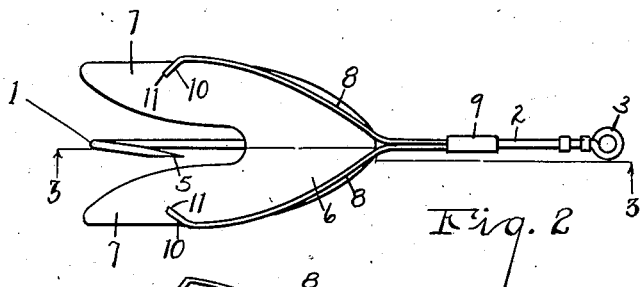
Fig. 2 is a plan view thereof.

Referring to the drawing, my improved fish bait or lure comprises a hook 1 having a shank 2 of substantial length terminating in a line attaching eye 3. On the body of the shank I mount a weight 4 which is disposed to project oppositely from the point 5 of the hook so that it tends to keep the hook point directed upwardly.

Figure 3:
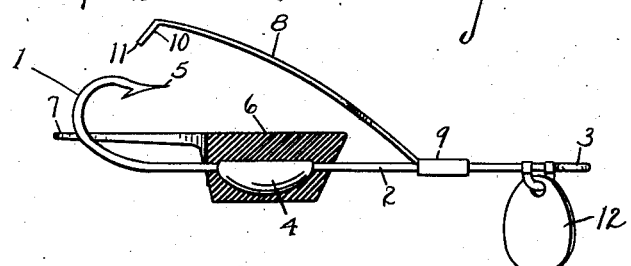
Fig. 3 is a detail view partially in longitudinal section on line 3—3 of Figs. 2 and 4.
Figure 4:
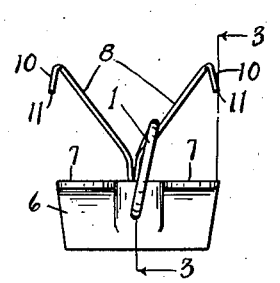
Fig. 4 is a rear elevation.

A body 6 preferably of rubber is mounted on the shank to embrace the weight 4 and in practice this body is vulcanized upon the shank. This body 6 has rearwardly projecting spaced wings 7 which are relatively thin but of substantial width so that, while they may yield readily in a vertical direction, they offer considerable resistance to lateral bending or distortion. These wings, as shown in Figs. 3 and 4, lie in a plane below the plane of the point of the hook, their inner edges preferably diverging as shown in Figs. 1 and 3, whereby the wings are gradually narrowed toward the rear, increasing the flexibility of their tips and increasing the clearance between the wings.

The guard arms 8, which are formed of spring wire, are secured to the shank by means of the clip 9, the arms diverging rearwardly above the body and their ends 10 lying in a plane above the plane of the point of the hook and overlying the wings. The extreme ends of the guards are directed inwardly and downwardly at 11.

By thus arranging the parts I provide a bait or lure which is especially well adapted for casting in weeds or lily-pads as the point of the hook is very effectively guarded and at the same time the guards, that is, the spring guard arms 8 and also the wings, yield when the bait is struck. The bait rights itself when drawn in, no matter in what position it may fall.

The body may be colored or ornamented as desired and, if desired, a tuft of feathers may be attached to the shank, but these are not illustrated as it is common practice to apply feathers to hooks of this general type and the application thereof will be readily understood.

In the embodiment illustrated I provide a spinner 12 of the spoon type which is swivelled upon the shank between the clip 9 and the eye 3 of the hook.

Having thus described my invention what I claim as new and desire to secure by Letters Patent is:

1. A fish bait or lure comprising a hook provided with a shank of substantial length, a weight on said shank projecting oppositely from the point of the hook, a body of resilient material molded on said shank to embrace said weight and having relatively thin spaced wings lying at the sides of the hook and in a plane below the plane at the point of the hook, the wings being of substantial width to afford substantial transverse resistance, and a pair of rearwardly diverging spring guard arms secured to said shank in advance of said body and projecting over the same with their rear ends normally in a plane above the plane of the point of the hook and overlying said wings coacting therewith to guard the point of the hook.

2. A fish bait or lure comprising a hook provided with a shank of substantial length, a body of resilient material through which said shank is disposed and mounted thereon in fixed position, said body having relatively thin spaced wings lying at the sides of the hook and in a plane between the shank and the point of the hook, the wings being of substantial width to afford substantial transverse resistance, and a pair of rearwardly diverging spring guard arms secured to said shank in advance of said body and projecting over the same with their rear ends normally in a plane above the plane of the point of the hook and overlying said wings coacting therewith to guard the point of the hook.

3. A fish bait or lure comprising a hook provided with a shank of substantial length, a weight on said shank projecting oppositely from the point of the hook, and a body of resilient material molded on said shank to embrace said weight and having relatively thin spaced wings lying at the sides of the hook and in a plane below the plane at the point of the hook, the wings being of substantial width to afford substantial transverse resistance.

In witness whereof I have hereunto set my hand.

CLARENCE H. WALTER.